United States Patent [19]
Meguro et al.

[11] Patent Number: 5,339,169
[45] Date of Patent: Aug. 16, 1994

[54] ELECTRONIC FILING SYSTEM

[75] Inventors: Tsuneo Meguro, Hadano; Hiroshi Sakata, Tottori, both of Japan

[73] Assignee: Ricoh Company, Ltd., Tokyo, Japan

[21] Appl. No.: 836,762

[22] Filed: Feb. 19, 1992

[30] Foreign Application Priority Data

Feb. 20, 1991 [JP] Japan .................................. 3-045675

[51] Int. Cl.$^5$ .............................................. A04N 1/00
[52] U.S. Cl. ...................................... 358/403; 358/404
[58] Field of Search ............... 358/400, 401, 403, 404, 358/444, 442, 434, 436, 438, 450, 440, 498, 470; 382/61, 48; 379/100

[56] References Cited

U.S. PATENT DOCUMENTS

| | | | |
|---|---|---|---|
| 4,352,012 | 9/1982 | Verderber et al. | 358/470 |
| 4,566,127 | 1/1986 | Sekiya et al. | 358/462 |
| 4,811,111 | 3/1989 | Kurokawa | 379/100 |
| 4,893,333 | 1/1990 | Baran et al. | 358/468 |
| 4,941,170 | 7/1990 | Herbst | 358/440 |
| 4,941,685 | 7/1990 | Anderson | 358/400 |
| 5,133,026 | 7/1992 | Fujiwara et al. | 358/470 |
| 5,267,047 | 11/1993 | Argenta et al. | 358/450 |

FOREIGN PATENT DOCUMENTS 0398184 11/1990 European Pat. Off. .
62-171371 7/1987 Japan .

*Primary Examiner*—Edward L. Coles, Sr.
*Assistant Examiner*—Jerome Grant, II
*Attorney, Agent, or Firm*—Oblon, Spivak, McClelland, Maier & Neustadt

[57] ABSTRACT

An electronic filing system includes a front page generating part for generating an image of a front page with respect to a designated station, an input part for inputting attribute data of each of data blocks in the image of the front page, so that the attribute data is stored in an image storage part, a character data storage part for storing a set of character strings with respect to each of external stations, and a control part for fetching a set of character strings with respect to the designated station from the character data storage part when an image is transmitted to a designated station, for generating output image data from each of the fetched character strings on the basis of the attribute data, and for generating an output image of the front page by allocating the output image data to the data blocks, so that the output image of the front page is transmitted to the designated station as a first page of the image of the document being transmitted.

8 Claims, 10 Drawing Sheets

FIG. 2

| IDENTIFICATION NUMBER | TELEPHONE NUMBER | NAME | NAME CODE | TERMINAL TYPE | TERMINAL CODE | FRONT PAGE FLAG | CHARACTER STRING-1 | CHARACTER STRING-2 | CHARACTER STRING-3 |
|---|---|---|---|---|---|---|---|---|---|

FIG. 3A

| TIME DATA | NUMBER OF SHEETS | SOURCE STATION DATA | CHARACTER STRING DATA-1 | CHARACTER STRING DATA-2 | CHARACTER STRING DATA-3 |

FIG. 3B

| FLAG | CHARACTER TYPE | CHARACTER SIZE |

FIG. 3C

| FLAG | CHARACTER TYPE | CHARACTER SIZE | DISPLAY POSITION | CHARACTER PITCH | DATA SIZE |

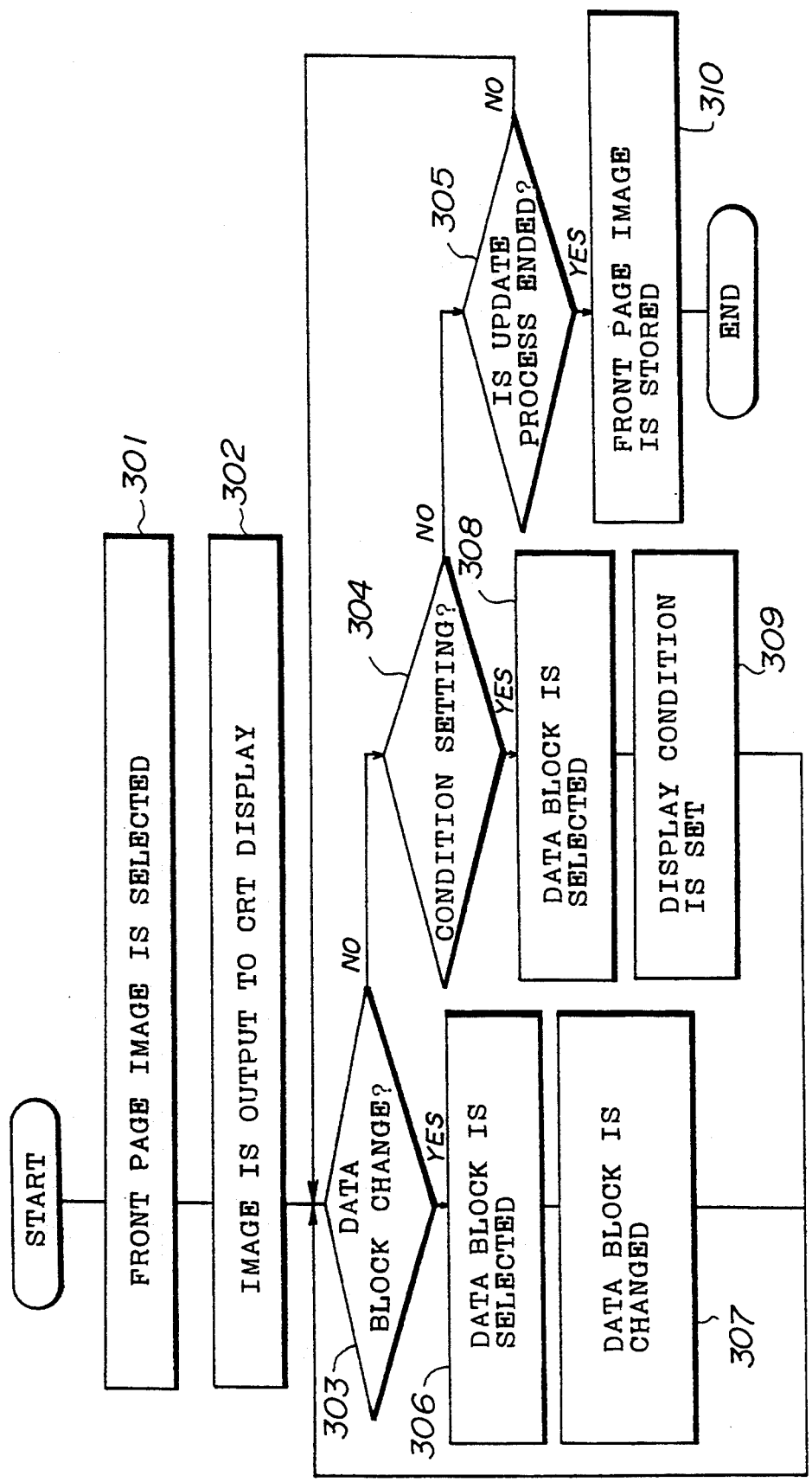

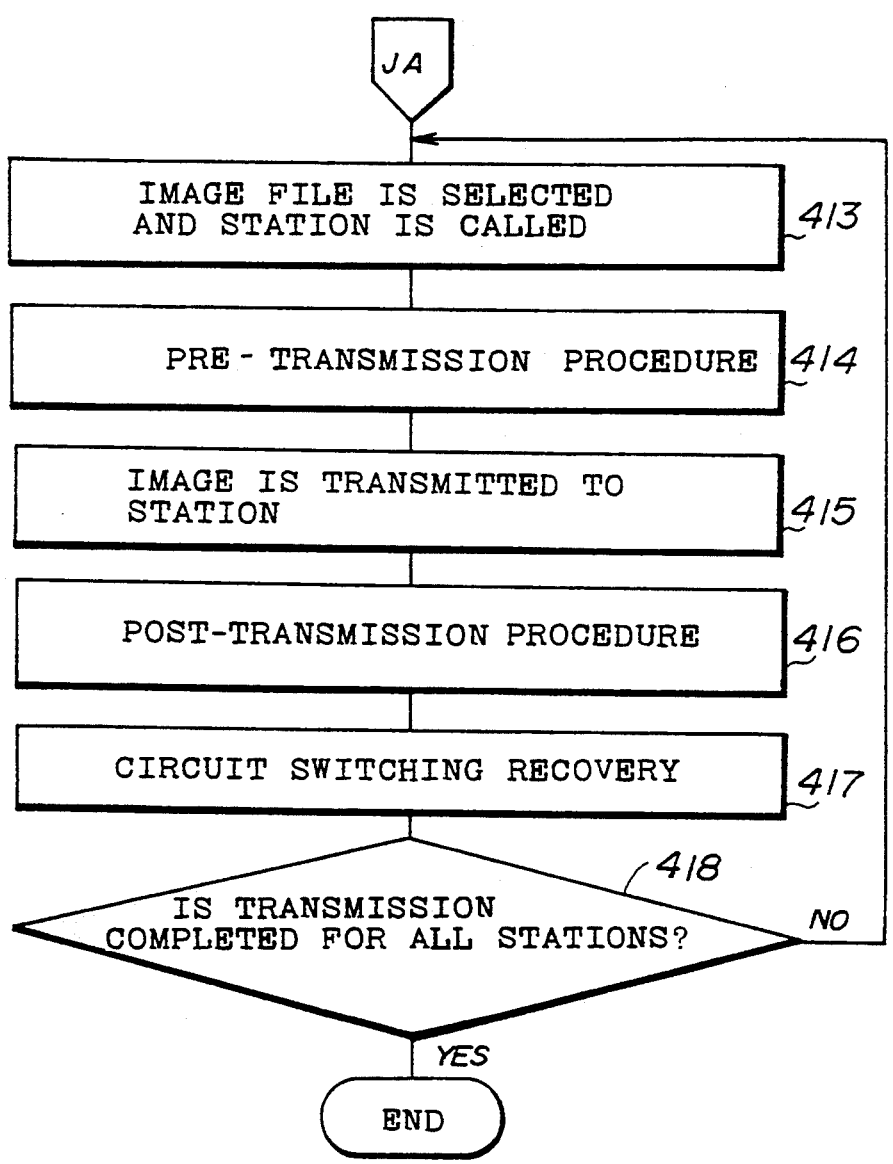

R1
          ┌ ─ ─ ─ ─ ─ ─ ─ ─ ─ ─ ─ ┐
          │ NO.OF SHEETS : XX     │        R2
          └ ─ ─ ─ ─ ─ ─ ─ ─ ─ ─ ─ ┘
          ┌ ─ ─ ─ ─ ─ ─ ─ ─ ─ ─ ─ ─ ─ ─ ─ ┐
          │   DATE    : YY-MM-DD  HH:MM   │
          └ ─ ─ ─ ─ ─ ─ ─ ─ ─ ─ ─ ─ ─ ─ ─ ┘
```

FIG. 11

```
   X X # #     COMPANY
   ═══════════════════════════════════

○ X ○ X   DEPT    MR  ABCDE
   ───────────────────────────────────

NO.OF SHEETS :  12

DATE  :  91-03-29    12 : 15
```

ELECTRONIC FILING SYSTEM

BACKGROUND OF THE INVENTION

The present invention relates generally to an electronic filing system, and more particularly to an electronic filing system in which an image of a scanned document is stored in a given format, a cover page is automatically generated and attached to the stored image, and an image of the document with the front page is transmitted to an external station through a facsimile transmission procedure.

In an electronic filing system, image data that is read out by scanning a document by means of an image scanner is stored in such a large-capacity memory device as a magneto-optic disk unit in a given document format, and the stored image data can be used when it is necessary to retrieve the document. Paper has conventionally been used for document filing and storing work. However, in the electronic filing system, a magneto-optic disk unit can be used instead of paper. This electronic filing system using the magneto-optic disk unit has been put into practical use.

There is also an electronic filing system having a capability of facsimile transmission, for example, a Group-III facsimile transmission capability. In this electronic filing system, image data of a document stored in the magneto-optic disk unit can be transmitted to a designated external facsimile by carrying out a facsimile transmission procedure, image data which is received from an external terminal through facsimile transmission can be stored in the magneto-optic disk unit, and the stored data can be used as document data for retrieving the document. This electronic filing system which is capable of facsimile transmission has been put into practical use.

In the above described electronic filing system having a facsimile transmission capability, it is possible to reduce storage space required for filing document data, and it is possible to transmit the document data stored in the storage device to an external terminal through facsimile transmission. Thus, one can efficiently utilize the document data, and time and labor needed for transmitting the document data can be remarkably reduced by means of the above described electronic filing system.

The above described electronic filing system is usually shared by a plurality of users. Therefore, it is difficult to recognize a station to which an image of document data is transmitted if only the image of the text section of the original document is transmitted. Conventionally, when an image of document data is transmitted, it is necessary to generate a cover page which specifies the station to which the image is transmitted. The cover page is scanned by a scanner so as to generate an image of the cover page, and the generated image is attached to the top of the image of the document being transmitted, so that an image of the document including the cover page is transmitted to the station. Therefore, the above described electronic filing system has a problem, as it is necessary for users to make a cover page, scan the cover letter to read out an image thereof, and enter the image of the cover page in the system each time an image of a document is transmitted through facsimile transmission. Because of this problem, the above mentioned electronic filing system is rather inconvenient for the users thereof.

SUMMARY OF THE INVENTION

Accordingly, it is a general object of the present invention to provide an improved electronic filing system in which the above described problems are eliminated.

Another and more specific object of the present invention is to provide an electronic filing system which automatically generates an image of a cover page specifying a station and other necessary data, and transmits an image of a document together with the image of the cover page to the station through a facsimile transmission procedure. The above mentioned object of the present invention can be achieved by an electronic filing system which includes an image storage part in which at least an image of a document being scanned by a scanner is stored in a prescribed format, a transmission control part for carrying out a facsimile transmission procedure in which the image stored in the image storage part is transmitted to an external station which is designated, a cover page generating part for generating an image of a cover page with respect to a designated station, the image of the cover page being attached to a top of the image of the document being transmitted to the designated station, and for storing the generated image of the cover page in a storage device, an input part for inputting attribute data of each of data blocks in the image of the cover page to which a set of character strings with respect to the designated station is allocated, so that the attribute data is stored in the image storage part, a character data storage part for storing a set of character strings with respect to each of external stations to which the image of the document is transmitted, and a control part for fetching a set of character strings with respect to a designated station from the character data storage part when an image is transmitted to the designated station, for generating output image data from each of the fetched character strings on the basis of the attribute data stored in the image storage part, and for generating an output image of the cover page by allocating the output image data to the data blocks whose attribute data is input by the input part, so that the output image of the cover page is transmitted to the designated station as a first page of the image of the document being transmitted. According to the present invention, it is possible to automatically generate an image of a cover page and transmit the generated image to a designated station as a first page of a document image being transmitted. Thus, it is unnecessary for an operator to manually generate a cover page image in which a designated station is specified. Also, a facsimile transmission capability of the electronic filing system is increased.

Other objects, features and advantages of the present invention will be more apparent from the following detailed description when read in conjunction with the accompanying drawings.

BRIEF DESCRIPTION OF THE DRAWINGS

FIG. 2 is a diagram showing a telephone directory data stored in a magnetic disk unit;

FIGS. 3A through 3C are diagrams showing a set of attribute data including a flag, date and flag, and output character settings contained in a front page data;

FIG. 6 is a flow chart for explaining an update process in which a stored cover page image is updated;

FIGS. 7A and 7B are a flow chart for explaining a transmission process in which a coded image data of a cover page attached to a top of a document is transmitted to a designated station;

FIG. 10 is a view showing an image of the cover page in which data blocks of a set of character string data are allocated; and FIG. 11 is a view showing an image of the cover page in which several character data is allocated to corresponding data blocks, which image is automatically generated when an image of a document is transmitted.

DESCRIPTION OF THE PREFERRED EMBODIMENT

Figure 1:
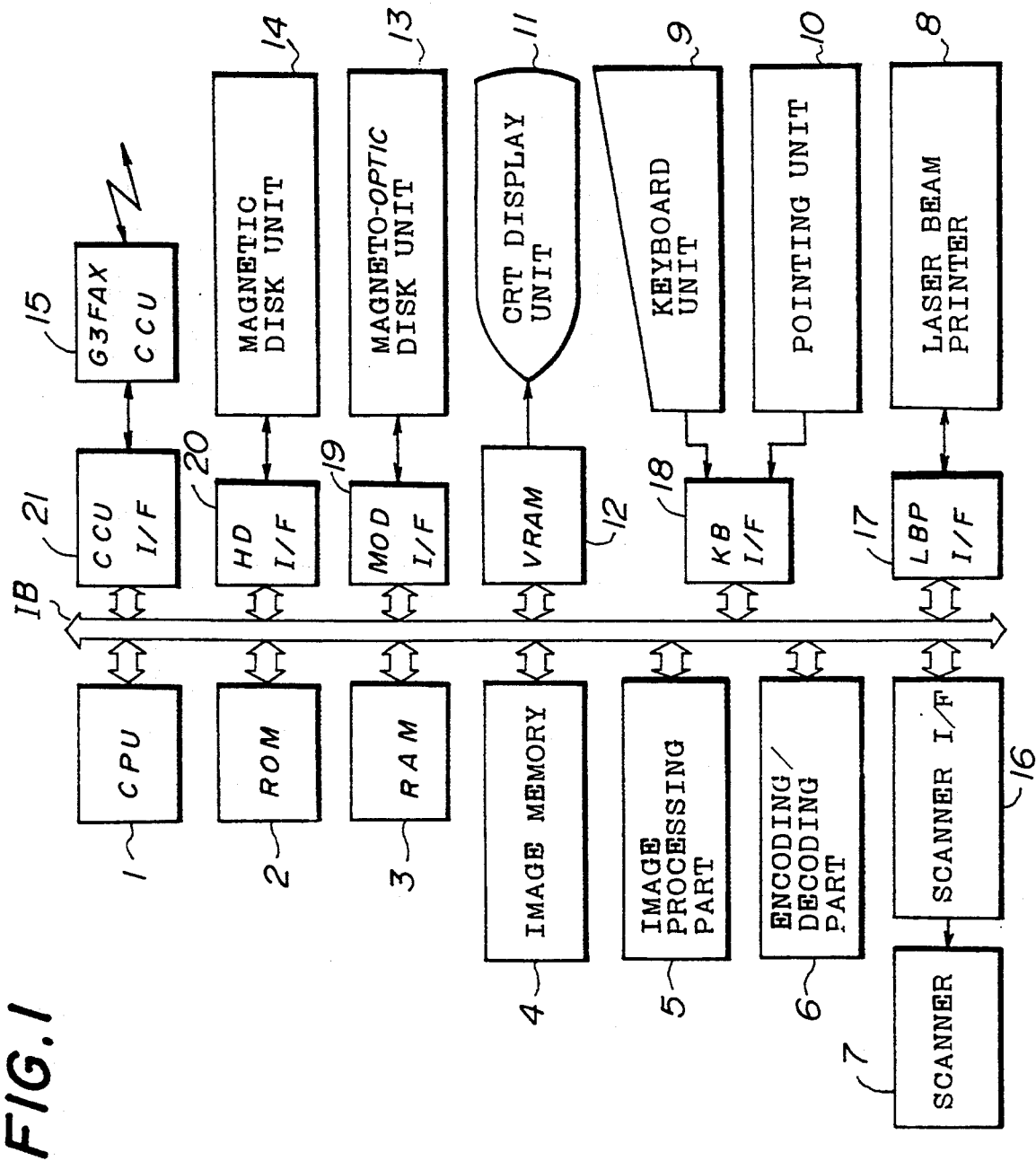
FIG. 1 is a block diagram showing an electronic filing system to which the present invention is applied.

A description will be given of an embodiment of an electronic filing system according to the present invention, by referring to FIG. 1. FIG. 1 shows an electronic filing system to which the present invention is applied. In FIG. 1, a CPU (central processing unit) 1 controls operations of the electronic filing system. A ROM (read-only memory) 2 is a memory in which a control program and several data required for the CPU 1 to execute control operations of the electronic filing system are stored. A RAM (random access memory) 3 is a memory which is used as a work area when the control operations of the electronic filing system are executed by the CPU 1. An image memory 4 is used as a work area when the CPU 1 performs a processing operation on image data.

An image processing part 5 generates geometric patterns such as an arc, a circle, a point, a line and a polygon, and carries out several image processing functions including image reduction and enlargement, pattern generation, and inversion and rotation of a designated area. An encoding/decoding part 6 carries out a compression of data by a coding process and a decoding of coded data by a decoding process which are a Group-III facsimile function.

A scanner 7 scans a document and reads out an image of the scanned document at a resolution of 300 dpi (300 dots per 25.4 mm) so that an image with this resolution is input to the electronic filing system. A laser beam printer 8 outputs an image from the electronic filing system at a resolution of 300 dpi (300 dots per 25.4 mm) so that the image is recorded on paper. A keyboard unit 9 is an input device for inputting character strings and several commands to the electronic filing system by an operator. A CRT (cathode ray tube) display unit 11 is an output device used to display several operating screens and data lists for an operator. A VRAM (video random access memory) 12 is a memory in which video data or display data being output to the screen of the CRT display unit 11 is stored. A pointing unit 10 is a device for pointing a position of input data on a CRT screen of the CRT display unit 11.

A magneto-optic disk unit 13 is a large-capacity data storage device in which an image data for document filing is stored. A magnetic disk unit 14 is a data storage device in which control programs including a system program of this electronic filing system and other application programs are stored, and, in this magnetic disk unit 14, data such as a telephone directory data which is intrinsic to the electronic filing system is stored.

A G3 FAX CCU (communication control unit) 15 carries out automatic data transmission and receiving through a public communication network, and carries out a prescribed Group-III facsimile transmission function. The G3 FAX CCU 15 has a digital modem function and a tone signal generating function. An internal bus IB is a bi-directional data path used to interconnect the above mentioned units and parts of the electronic filing system for exchanging data therebetween. A scanner interface circuit (SCANNER I/F) 16 is provided to connect the scanner 7 to the internal bus IB so that an interface between the scanner and the system is established. A laser beam printer interface circuit 17 (LBP I/F) is provided to connect the laser beam printer 8 to the internal bus IB so that an interface between the laser beam printer 8 and the system is established. A keyboard interface circuit 18 (KB I/F) is provided to connect the keyboard unit 9 and the pointing unit 10 to the internal bus IB so that an appropriate interface between the keyboard unit 9 (together with the pointing unit 10) and the system is established.

A magneto-optic disk interface circuit 19 (MOD I/F) is provided to connect the magneto-optic disk unit 13 to the internal bus IB so that an interface between the magneto-optic disk unit 13 and the system is established. A magnetic disk interface circuit 20 (HD I/F) is provided to connect the magnetic disk unit 14 to the internal bus IB so that an interface between the magnetic disk unit 14 is established. A communication control unit interface circuit 21 (CCU I/F) is provided to connect the G3 FAX CCU 15 to the internal bus IB so that an interface between the G3 FAX CCU 15 and the system is established.

In the electronic filing system, memory management with respect to data stored in the magneto-optic disk unit 13 is carried out on the basis of a page or on the basis of a document made up of plural pages. A page is a logical block of storage used for the memory management. The image data stored in the magneto-optic disk unit 13 includes image data read out by means of the scanner 7, image data generated by means of a drawing function, and image data received from an external G-III facsimile terminal or from another electronic filing system. With the above electronic filing system, an operator can call out an image from the magneto-optic disk unit 13 so that an editing operation of the called image can be carried out. Also, an operator can generate a new image or a new document data so that the newly generated data is stored in the magneto-optic disk unit 13, or the newly generated data is recorded on paper by means of the laser beam printer 8.

The electronic filing system according to the present invention has a telephone directory data which is used to carry out an automatic calling procedure in which a station is automatically called by the system. By making use of a plurality of the telephone directory data, it is possible for the electronic filing system to automatically call a plurality of stations for transmitting an image to each of the stations. FIG. 2 shows a telephone directory data with respect to one station, and the electronic filing system has a telephone directory data which corresponds with respect to each of the stations.

In FIG. 2, the telephone directory data includes several data elements, an identification number data denoting which station this telephone directory data is related to, the image being transmitted to the station, a telephone number data denoting a telephone number of the station, a name data denoting the name of a person or a company owning the station, a name code data denoting a code of the name used when the station is retrieved or searched for, a terminal type data indicating whether or not the type of the station is the same as the electronic filing system or a type of a Group-III facsimile terminal, a terminal code data denoting a code of the station used for checking other attribute data of the station, a cover page flag indicating whether or not a cover page function is used when an image is transmitted to the station, and a set of character string data including a character string-1 data, a character string-2 data and a character string-3 data, which are allocated to corresponding blocks in an image of a cover page if a front page function is used when an image is transmitted to the station. The telephone directory data corresponding to each of the stations is generated by executing an application program installed in the electronic filing system, and the generated telephone directory data is stored in the magnetic disk unit 14. The execution of this application program is started by an operator.

The electronic filing system according to the present invention has a plurality of cover page data which are entered and stored. FIG. 3A shows a set of data elements which is allocated to corresponding blocks in one cover page data among the plurality of front page data being stored in the electronic filing system. In FIG. 3A, the data elements contained in one cover page data are a time data describing the transmission date and time when an image is transmitted to a station, a sheet number data describing the number of sheets or pages of the image being transmitted, a source station data for identifying an owner of a source station from which an image is transmitted, and a set of character string data-1, character string data-2 and character string data-3 describing respectively the character string-1, the character string-2 and the character string-3 which are allocated to the corresponding blocks in the cover page data.

FIG. 3B shows attribute data with respect to each of the time data and the sheet number data in the cover page data shown in FIG. 3A. Each of the time data and the cover page data includes a flag indicating whether or not the data element is allocated to a corresponding block in the cover page data and displayed with the cover page image, a character type indicating whether output characters in the cover page image are of a full-scale font or of a half-scale font, and a character size indicating the size of output characters in the cover page image.

FIG. 3C shows attribute data with respect to each of the source station data, the character string data-1, the character string data-2 and the character string data-3 included in the cover page data shown in FIG. 3A. Each of these data elements includes a flag indicating whether or not the data element is allocated to a corresponding block in the cover page data and displayed with the cover page image, a character type indicating whether output characters in the data element are of a full-scale font or of a half-scale font, a character size indicating the size of output characters in the data element, a display position indicating the position of a first character of an output character string in the data element, a character pitch indicating the pitch between characters in the data element, and a data size indicating the number of output characters in the data element.

Figure 4:
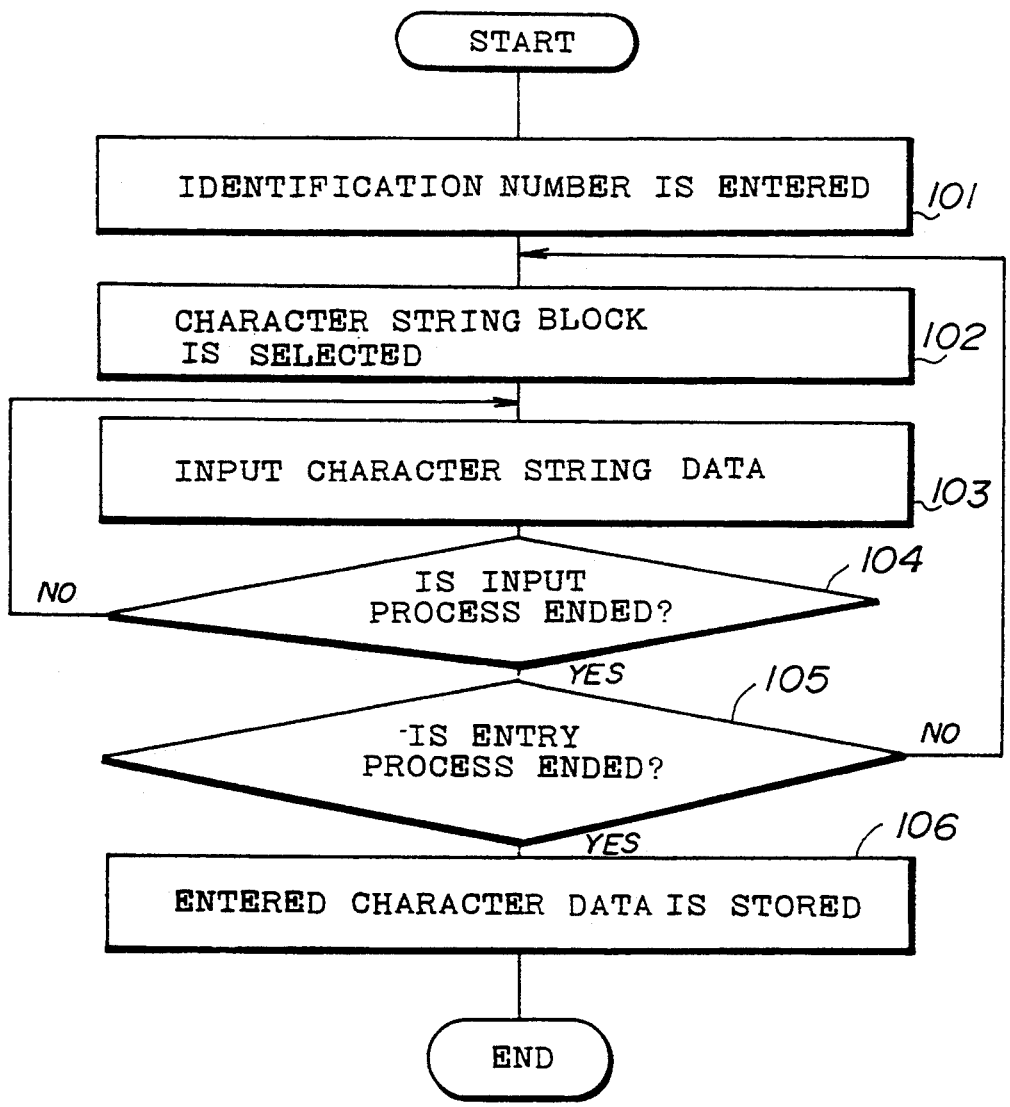
FIG. 4 is a flow chart for explaining an entry process in which a set of character string data is entered to corresponding blocks in a telephone directory data in the magnetic disk unit.

FIG. 4 shows an entry process in which a set of character string data, which may include the character string-1 data, the character string-2 data and the character string-3 data, is newly entered in a telephone directory data, and the telephone directory data is stored in the magnetic disk unit 14. In this entry process, a set of character string data being newly entered is allocated to corresponding blocks in the telephone directory data respectively.

In step 101, an operator is instructed to enter an identification number for identifying the telephone directory data to which this entry process is directed. In step 102, the operator is instructed to select one block from the character string data blocks in the telephone directory data, to which block a character string data is newly entered. In step 103, a character string data is input in an appropriate manner so that the character string data is allocated to the selected block of the telephone directory data. Step 104 checks whether or not the input process is ended normally. When the input process is ended normally, step 105 asks the operator whether or not the entry process should be ended. If the operator gives an instruction in reply that the entry process should not be ended, the procedure is returned to the step 102 so that an input process in which another character string data is input to a selected block of the telephone directory data is repeated in the same manner. If the operator's answer to the inquiry in step 105 is affirmative, a set of the input character string data is allocated to corresponding blocks of the telephone directory data, which blocks may include the character string-1, the character string-2 and the character string-3, and the telephone directory data is stored in the magnetic disk unit 14 in step 106. The telephone directory data in which a set of character string data is entered to corresponding blocks, stored in the magnetic disk unit 14 in the above described entry process, is allocated to corresponding blocks in a front page image.

Figure 5:
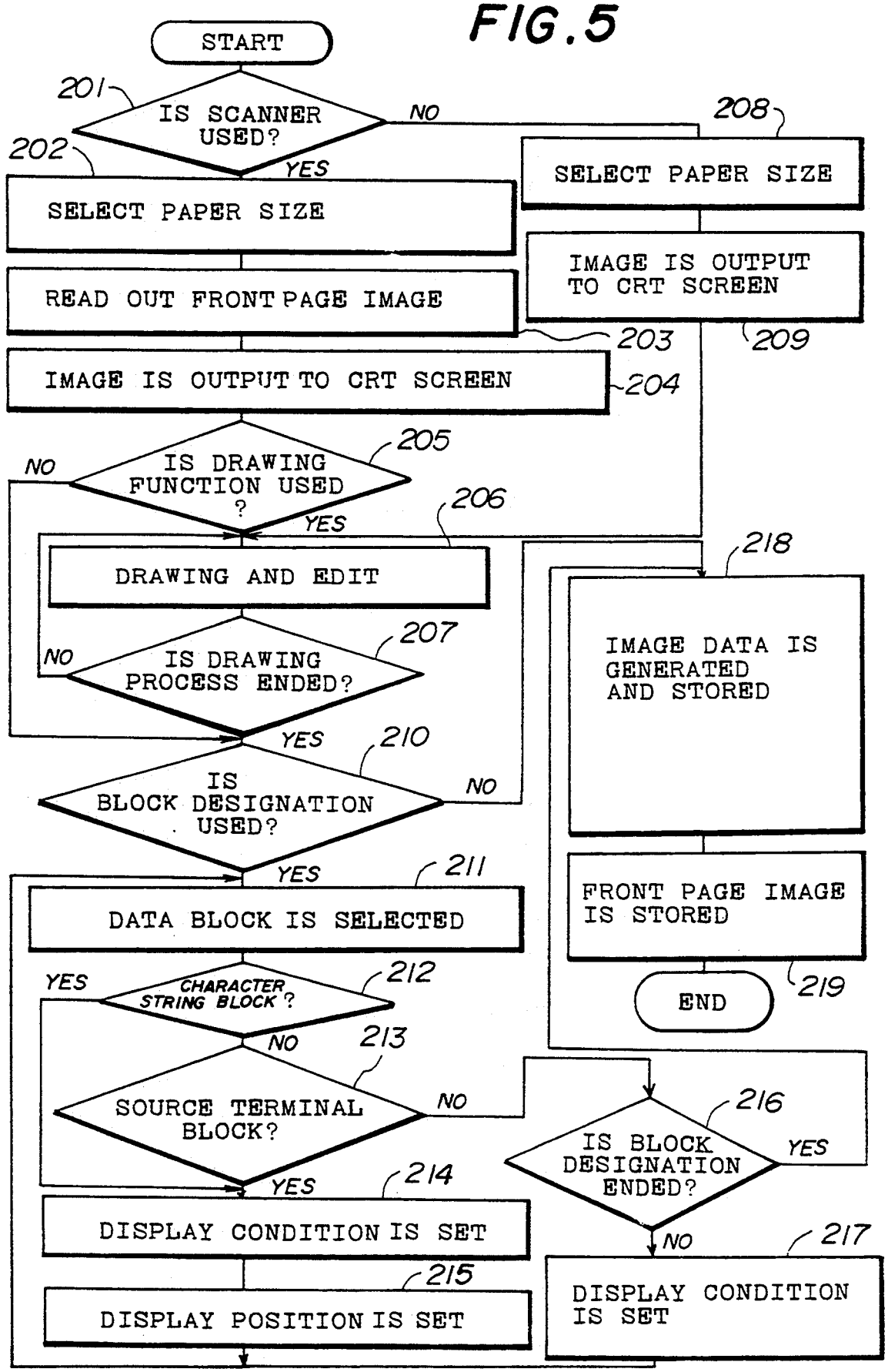
FIG. 5 is a flow chart for explaining an entry process in which an image data of a cover page is entered and stored.

FIG. 5 shows an entry process in which an image data of a cover page is entered and stored. In step 201, an operator is given the option whether or not to use the scanner 7 for inputting an image of a cover page, or not. If the scanner input option is selected, the operator is instructed, in step 202, to select a paper size of an original of the front page with a direction in which the sheet of the original is placed on the scanner 7. For example, an A4 paper size with its longitudinal direction or an A5 paper size with its lateral direction can be selected.

Once the paper size and its direction is selected by the operator, a guidance is displayed on the CRT screen in which the operator is instructed to perform a setting of the sheet of the original to the scanner 7 and an entry of a command to make the scanner 7 start a reading operation. When the reading start command is entered by the operator, an image of the original of the cover page is read out by the scanner 7 in step 203. In step 204, the image data of the cover page being read out is converted into output data with a resolution which is in accordance with the resolution of the CRT display unit 11, and the output data is transferred to the VRAM 12 so that the image of the cover page is displayed on the screen of the CRT display unit 11.

In step 205, the operator is given the option whether or not to use the drawing function. If the drawing function option is selected by the operator, a drawing function routine is started so that the operator can perform a drawing and editing operation by means of the drawing function in step 206, whereby an image of a geometry pattern is generated and inserted into the image of the front page. The image data of the geometry pattern is generated in the step 206 as output data with a resolution of 300 dpi (300 dots per 25.4 mm). Step 207 detects whether or not the drawing process has ended.

If the scanner input option is not selected in step 201, the operator is instructed, in step 208, to select a paper size of the cover page. In step 209, an image data of the cover page having only a border determined by the selected paper size is converted into output data with a resolution in accordance with the resolution of the CRT display unit 11, and the output data is transferred to the VRAM 12 so that the image of the border of the cover page is displayed on the screen of the CRT display unit 11. Then, the step 206 is performed so that an image of a geometry pattern is generated and inserted into the image of the border of the cover page.

When either the end of the drawing process is detected in step 207 or the drawing function option is not selected in the step 205, the operator is asked whether or not a data block designation is used in step 210. If the data block designation is used, the operator is instructed, in step 211, to designate a data block from the time data, the sheet number data, the source station data, the character string data-1, the character string data-2 and the character string data-3, the designated data block being displayed in the cover page image.

Step 212 checks whether or not a character string block has been designated. This block is selected from the character string-1, the character string-2, and the character string-3 in the front page data. Step 213 checks whether or not a block of the source station data has been designated. When the answer to either step 212 or step 213 is affirmative, a display condition setting of the designated data block is performed in step 214. The display conditions set in step 214 include a character type, a character size, a character pitch and a data size indicating the number of output characters. Image data having a display frame in accordance with the set display conditions is displayed on the screen of the CRT display unit 11. A display position setting of the designated data block is performed by means of the pointing unit 10 in step 215. After the setting process with respect to one data block is completed, the procedure is returned to step 211 to check whether or not another data block is designated. Step 216 detects whether or not the data designation process has ended.

If either the time or the sheet number data is designated and the answers in steps 212, 213 and 216 are negative, a setting of display condition of the designated data blocks performed in step 217. Then, the procedure is returned to step 211 to check whether or not another data block is designated. When the setting of the display conditions and display positions for all the designated data blocks is completed and the end of the data designation process is detected in step 216, the image data being generated either by the scanner input function or by the drawing function is compressed through a prescribed coding process so that the data is converted into output image data and the output image data with its identification code is stored in the magneto-optic disk unit 13 in step 218. Then, a cover page image having data elements whose display conditions and positions are set in the preceding steps is generated, and the cover page image with its identification code, which code is the same as that of the output image data, is stored in the magnetic disk unit 14 in step 219.

When the data block designation option is not selected in step 210, step 218 is performed so that the data of the image generated is compressed through a prescribed coding process, the image data is converted into output image data, and the output image data with its identification code is stored in the magneto-optic disk unit 13. In this case, there is no data element whose display conditions and positions are set in the preceding steps, but a cover page image having no data element is generated and the generated image is stored in the magnetic disk unit 14. As described in the foregoing, one cover page image and its output image data are stored in the magnetic disk unit 13 and in the magneto-optic disk unit 14, respectively, by carrying out the entry process shown in FIG. 5.

FIG. 6 shows an update process in which a stored cover page image is updated. In step 301, a list of the stored cover page images, stored in the magnetic disk unit 13, is displayed on the screen of the CRT display unit 11 in a given format, and an operator is instructed to select from the list a cover page image which is updated. A set of output image data with respect to the selected cover page image is read out from the magneto-optic disk unit 13, and the selected cover page image is read out from the magnetic disk unit 14. The output image data with respect to the cover page image is decoded into the original image data, and the original image data is transferred to the VRAM 12. A set of output image data is generated based on the stored data in the data blocks of the cover page image is transferred to the VRAM 12. The selected cover page image in which the output image data is inserted in the corresponding data blocks is then displayed on the screen of the CRT display unit 11 in step 302.

Next, a guidance for the update process is displayed on the CRT screen in which the operator is instructed to select from a data block change option, a display condition setting option and an update process end option. If the data block change option is selected in step 303, the operator is instructed to designate a data block in the front page image which block is to be updated, in step 306, and the data block is changed to a next one in step 307, and the procedure is returned to step 303. The data block which can be designated in the above procedure is one of the character string-1 data block, the character string-2 data block, the character string-3 data block and the source station data block in the cover page image.

If the display condition setting is selected in step 304, the operator is instructed, in step 308, to select a data block whose display condition or display position is to be updated, and the setting of the display condition or the display position with respect to the data block is made in step 309, then the procedure is returned to step 303. If the update process end is selected in step 305, the cover page image in which the data of the designated data blocks are updated is stored in the magnetic disk unit 14 in step 310.

As described in the foregoing, the display condition and position with respect to each of the designated data blocks of the cover page image are updated, the updated cover page image is stored in the magnetic disk unit 14, and then the update process as shown in FIG. 6 is completed.

Figure 7A:
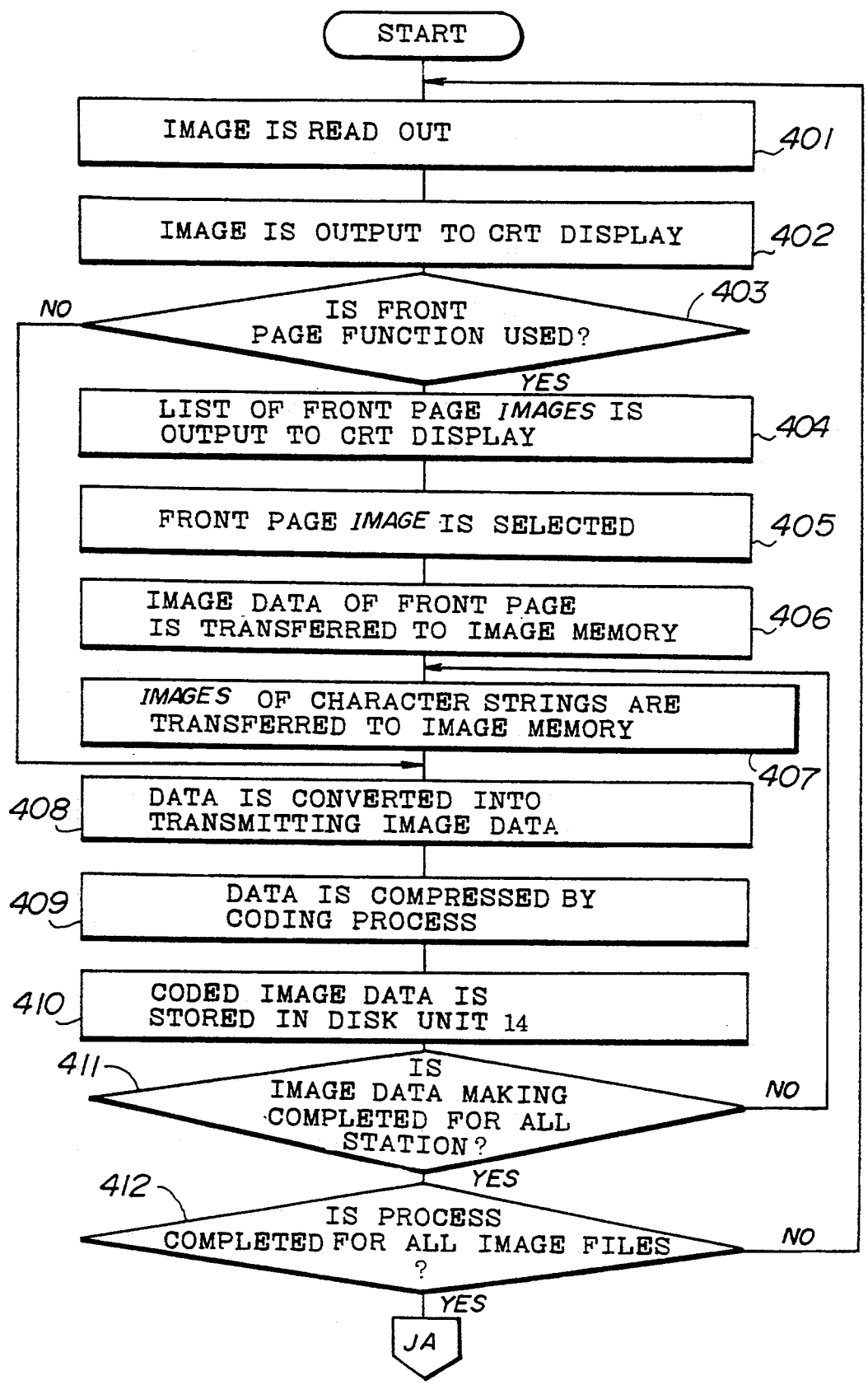

FIGS. 7A and 7B show a transmission process in which an image is transmitted to a designated external station. In this transmission process, an operator is first instructed to select one or more image files to be transmitted on the basis of a page or on the basis of a document, and designate one or more external stations to which an image of the selected image file is transmitted.

After the image files are selected and the external stations are designated by the operator, in step 401, an image of a selected image file is read out from the magneto-optic disk unit 13. In step 402, the image is output to the CRT display unit 11 so that the selected image is displayed on the CRT screen. Step 403 checks whether or not a cover page function according to the present invention is used. If the cover page function is used, a list of cover page images stored in the magnetic disk unit 14 is output to the CRT display unit 11 in step 404. The operator is instructed, in step 405, to select a cover page image that is attached to a top of the document image being transmitted, from the list of the cover page images. In step 406, output image data with respect to the selected front page image is read out from the magneto-optic disk unit 13, and the output image data is transferred to the image memory 4. In step 407, the selected front page image is read out from the magnetic disk unit 14, output image data is generated based on the data elements of the selected cover page image, and the image is transferred to the image memory 4 so that a cover page image in which the output image data is allocated to corresponding data blocks is formed in the image memory 4. When the cover page image includes a source station data element, the operator is instructed to input the person or the company owning the source station for the source station data. The output image data for each of the data elements in the front page image is formed to have a resolution of 300 dpi which is in accordance with the resolution of a transmitting image data.

After the output image data is formed in the image memory 4, in step 408, the output image data and the selected image of the document for each page in the image memory 4 are converted into a transmitting image data having a resolution in accordance with the resolution of the Group-III transmission function. In step 409, the transmitting image data is compressed through a prescribed coding process into a coded image data. In step 410, the coded image data is temporarily stored in the magneto-optic disk unit 14.

Step 411 checks whether or not the above mentioned image data making process is completed for all the designated stations. If the image data making process is not yet completed, the procedure is returned to the step 407 so that an image data making process with respect to a following designated station is carried out in a similar manner. If the image data making process is completed for all the designated stations, step 412 checks whether or not the image data making process is completed for all the selected image files. If the process has not yet been completed, the procedure is returned to step 401 so that the above mentioned process with respect to a following selected image file is carried out in a similar manner. If the process is completed for all the selected image files, in step 413, one image file is selected from the selected image files and one station is selected from the designated stations, and the selected station is called. In step 414, a pre-transmission process required when a prescribed Group-III facsimile transmission procedure is carried out is performed. In step 415, the coded image data with respect to the selected image file is transmitted to the designated station by carrying out the Group-III facsimile transmission procedure. In step 416, a post-transmission procedure required is carried out after the image data is transmitted. In step 417, the circuit switching is recovered.

After the transmission process with respect to one designated station is completed, step 418 checks whether or not the transmission process is completed for all the designated stations. If the transmission process has not yet been completed, the procedure is returned to step 413 so that the transmission process is repeated in a similar manner. If the transmission process is completed for all the designated stations, the procedure shown in FIGS. 7A and 7B is ended.

As described in the foregoing, the transmission process is carried out, and the coded image data with respect to each of the selected image files is transmitted to one or more designated stations, the coded image data including the front image data with respect to the corresponding station.

Figure 8:
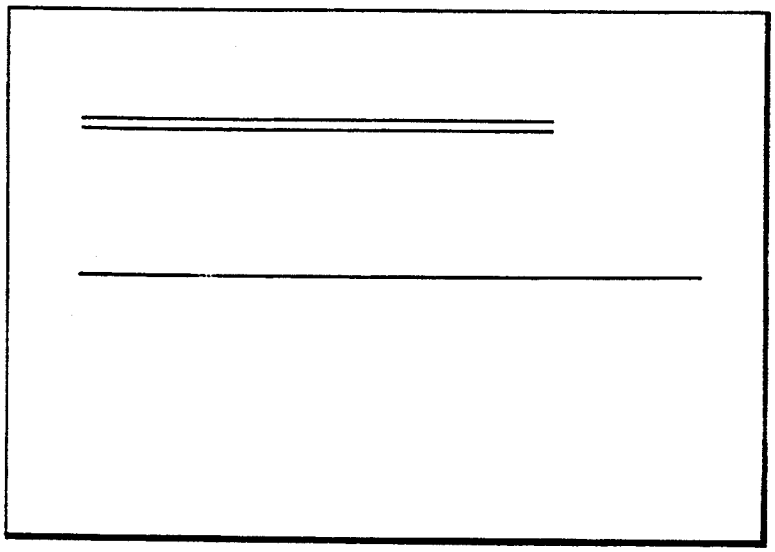
FIG. 8 is a view showing an image of a basic form of a cover page.

Next, a description will be given of operations of the electronic filing system when an image of a cover page is generated. An operator starts execution of the application program for generating a cover page image. In a case where a basic form of a cover page image is already prepared, the operator selects the scanner input option, selects a paper size of the original cover page, and instructs the system to read out an image by scanning the original cover page by means of the scanner 7. The image of the original cover page is then displayed on the screen of the CRT display unit 11. FIG. 8 shows such a basic form of a cover page image.

Figure 9:
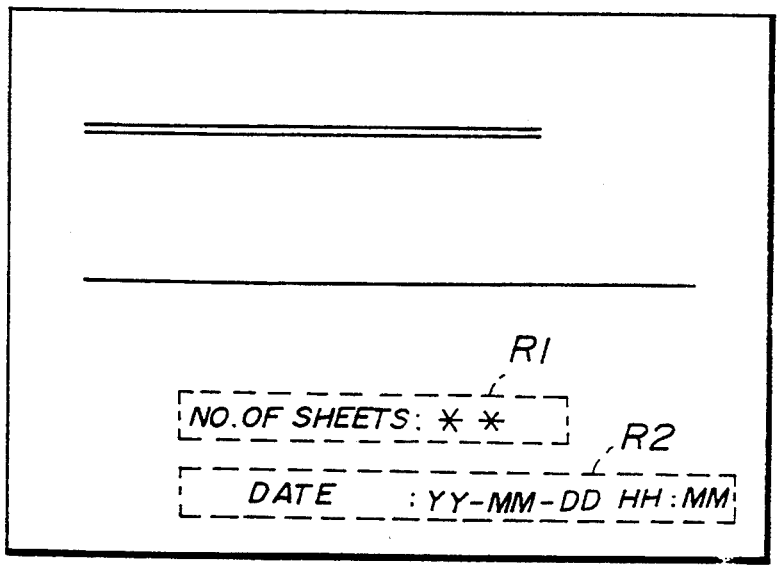
FIG. 9 is a view showing an image of the cover page in which a sheet number data block and a date/time data block are allocated.

If a sheet number data and a date/time data are displayed in the image of the cover page, a data block R1 of the sheet number data and a data block R2 of the date/time data are selected, and the display conditions of the selected data blocks are input by the operator in an appropriate manner. The display positions of the sheet number data and the date/time data are preset as fixed attribute data. The image of the cover page including the data block R1 of the sheet number data and the data block R2 of the date/time data is then displayed on the screen of the CRT display unit 11. FIG. 9 shows such an image of the cover page including the data blocks R1 and R2.

If a set of character string data including a character string-1 data, a character string-2 data and a character string-3 data is displayed in the image of the cover page, data blocks R3, R4 and R5 of the set of character string data are selected, and the display conditions and positions of the data blocks are input in an appropriate manner. The image of the front page further including the data blocks R3, R4 and R5 is then displayed on the screen of the CRT display unit 11. FIG. 10 shows such an image of the cover page in which the data blocks R3, R4 and R5 are allocated.

In a case in which "XX## COMPANY", "OXOX DEPT." and "MR. ABCDE" are set in the character string-1, the character string-2 and the character string-3 of a telephone directory data, these character strings are respectively allocated to the data blocks R3, R4 and R5 in the image of the cover page. This telephone directory data is selected from the plurality of telephone directory data stored in the magnetic disk unit 14, on the basis of a station which is designated by the operator when an image is transmitted. Output image data of the above mentioned cover page is generated, and the output image data of the cover page is output to the CRT display unit 11. Also, in a case in which the number of sheets of the image being transmitted is "12" and the transmission date/time is "91-03-29 12:15", output image data of these data elements are automatically generated, and the output image data is output to the CRT display unit 11. FIG. 11 shows such an image of the cover page in which the above character strings are allocated to the corresponding data blocks. The output image data of the cover page thus generated is converted into transmitting image data with a resolution of the Group-III facsimile transmission function, and the image data of the front page is transmitted to the designated station as a first page of a document image being transmitted.

As described in the foregoing, according to the present invention, an image of a cover page in which a set of preset character strings are allocated to corresponding blocks in a preset basic form of the cover page is automatically generated, and the generated image is transmitted to a designated station as a first page of a document image being transmitted. It is unnecessary for an operator to manually generate a cover page image in which a designated station, for example, is specified. This cover page function is especially useful when an image is transmitted to plural stations.

The above described electronic filing system is capable of receiving an image from an external Group-III facsimile terminal, and is capable of transmitting-/receiving an image to/from another electronic filing system of the same type. However, a description thereof is omitted as the capabilities of the system do not relate to the present invention.

In addition, in the above described embodiment, the sheet number data, the date/time data, the source station data, the character string-1 data, the character string-2 data and the character string-3 data can be allocated to corresponding blocks in an image of a cover page being generated. However, the present invention is not limited to these data elements, and another kind of data elements and a different number of data elements can be used in the telephone directory data and in the cover page image. Also, in the above described embodiment, the magneto-optic disk unit is used as an image data storage mediums. However, a different large-capacity data storage device can be used in the electronic filing system.

Further, the present invention is not limited to the above described embodiment, and variations and modifications may be made without departing from the scope of the present invention.

What is claimed is:

1. An electronic filing system comprising:
   image storage means in which at least an image of a document being scanned by a scanner is stored in a prescribed format;
   transmission control means for carrying out a facsimile transmission procedure in which the image stored in the image storage means is transmitted to an external station which is designated;
   cover page generating means for generating an image of a cover page with respect to a designated station, said image of said cover page being transmitted prior to the first page of the document being transmitted to the designated station, and for storing the generated image of the cover page in a storage device;
   input means for inputting attribute data of each of data blocks in the image of the cover page to which a set of character strings with respect to the designated station is allocated, so that said attribute data is stored in the image storage means;
   character data storage means for storing a set of character strings with respect to each of external stations to which an image of a document is transmitted; and
   control means for fetching a set of character strings with respect to a designated station from said character data storage means when an image is transmitted to the designated station, for generating output image data from each of the fetched character strings on the basis of the attribute data stored in the image storage means, and for generating an output image of the cover page by allocating the output image data to the data blocks whose attribute data is input by the input means, so that said output image of the cover page is transmitted to the designated station prior to said first page of the document being transmitted.

2. An electronic filing system as claimed in claim 1, wherein said image storage means is a magneto-optic disk unit in which an image of a document being scanned by a scanner, an image being received from an external facsimile terminal or an external electronic filing system, and the attribute data being input by said input means are stored.

3. An electronic filing system as claimed in claim 1, wherein said character data storage means is a magnetic disk unit in which telephone directory data including a set of character strings with respect to each of the external stations to which an image of a document is transmitted is stored.

4. An electronic filing system as claimed in claim 1, wherein said storage device in which the image of the cover page generated by the cover page generating means is stored is the same as said character data storage means.

5. An electronic filing system as claimed in claim 1, wherein a magnetic disk unit in which telephone directory data with respect to each of a plurality of external stations is stored is shared by the character data storage means and the storage device, said telephone directory data including a set of character strings with respect to each of the external stations.

6. An electronic filing system as claimed in claim 1, wherein said control means generates an output image of a cover page by allocating output image data of character strings to corresponding data blocks in a front page image with respect to each of a plurality of external stations when the plurality of external stations are designated.

7. An electronic filing system as claimed in claim 1, wherein said control means displays a list of a plurality of cover page images which are previously stored in the storage device, an operator being instructed to select one cover page from said list of the cover page images, so that said control means generates an output image of the selected cover page by allocating output image data of character strings to corresponding data blocks.

8. An electronic filing system as claimed in claim 1, wherein said output image of the cover page is transmitted by said transmission control means after the output image is compressed through a coding process.

* * * * *